United States Patent [19]

McElroy et al.

[11] 4,433,450
[45] Feb. 28, 1984

[54] SECONDARY BAG ADJUSTMENT

[76] Inventors: Lucian G. McElroy, 3315 Brocker Rd., Metamora, Mich. 48455; David R. Day, 4334 Ocean Dr., Apt. 203, Corpus Christi, Tex. 78412

[21] Appl. No.: 378,957

[22] Filed: May 17, 1982

[51] Int. Cl.³ .............................................. F26B 19/00
[52] U.S. Cl. ................................ 15/316 R; 15/312 A
[58] Field of Search .................. 15/312 A, 316 R, 405

[56] References Cited

U.S. PATENT DOCUMENTS

| | | | |
|---|---|---|---|
| 3,570,042 | 3/1971 | Solomon | 15/316 R |
| 3,600,224 | 8/1971 | Stilwell | 15/312 A X |
| 4,161,801 | 7/1979 | Day et al. | 15/316 R |

Primary Examiner—Chris K. Moore
Attorney, Agent, or Firm—Harold W. Milton, Jr.

[57] ABSTRACT

An apparatus 10 for stripping fluid from the surface of a vehicle including a plenum 14 and a flexible inflatable primary bag 20 having a primary bag inlet releasably mounted on the plenum 14 for allowing the flow of air from the plenum 14 to the primary bag 20 and a nozzle end 22 and a bag opening 24 disposed between the primary bag inlet and the nozzle end 22. The apparatus further includes a flexible inflatable secondary bag 26 having an elongated secondary bag inlet 28 secured about the bag opening 24 for hinging movement and a nozzle end 30 for allowing the flow of air therethrough. The apparatus is characterized by including a hinging control frame 34 for controlling the hinging action of the secondary bag 26 with respect to the primary bag 20.

8 Claims, 5 Drawing Figures

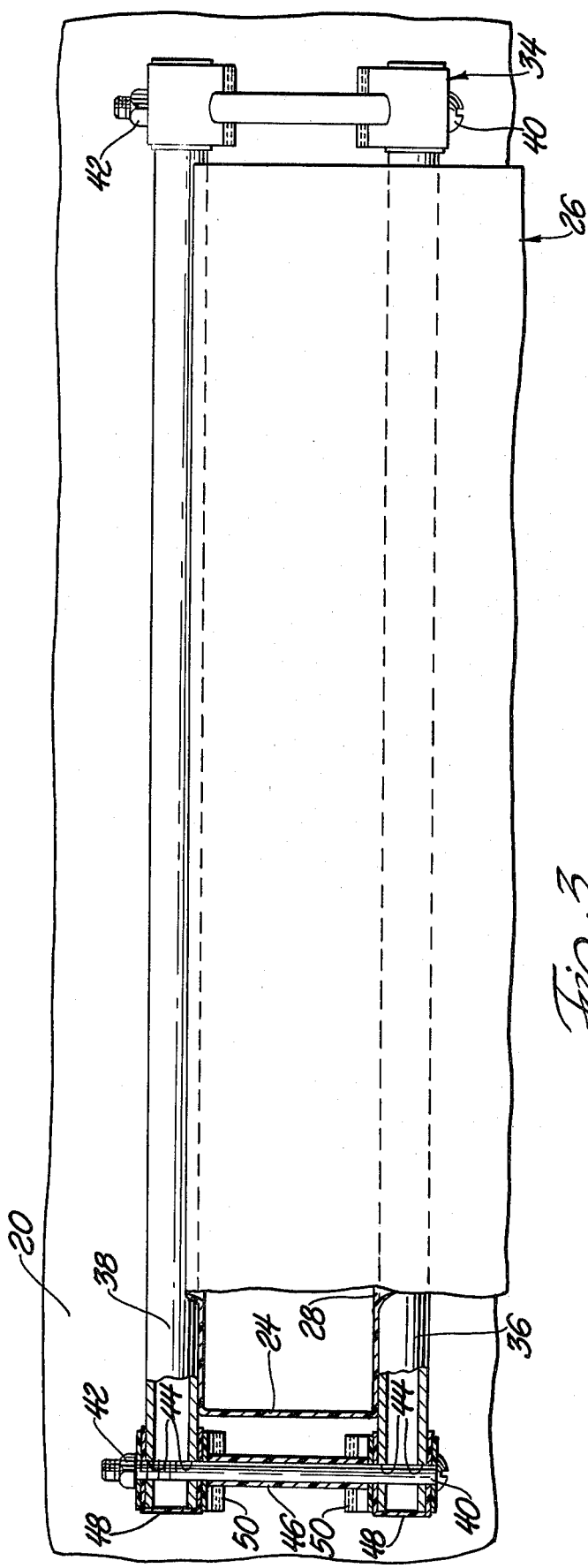
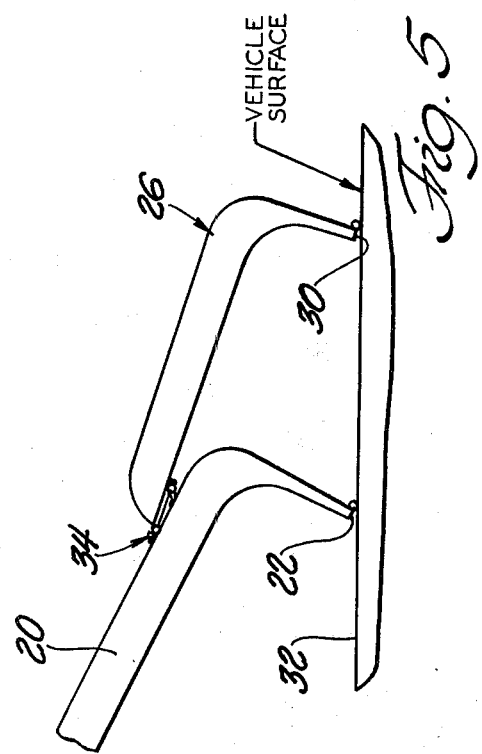
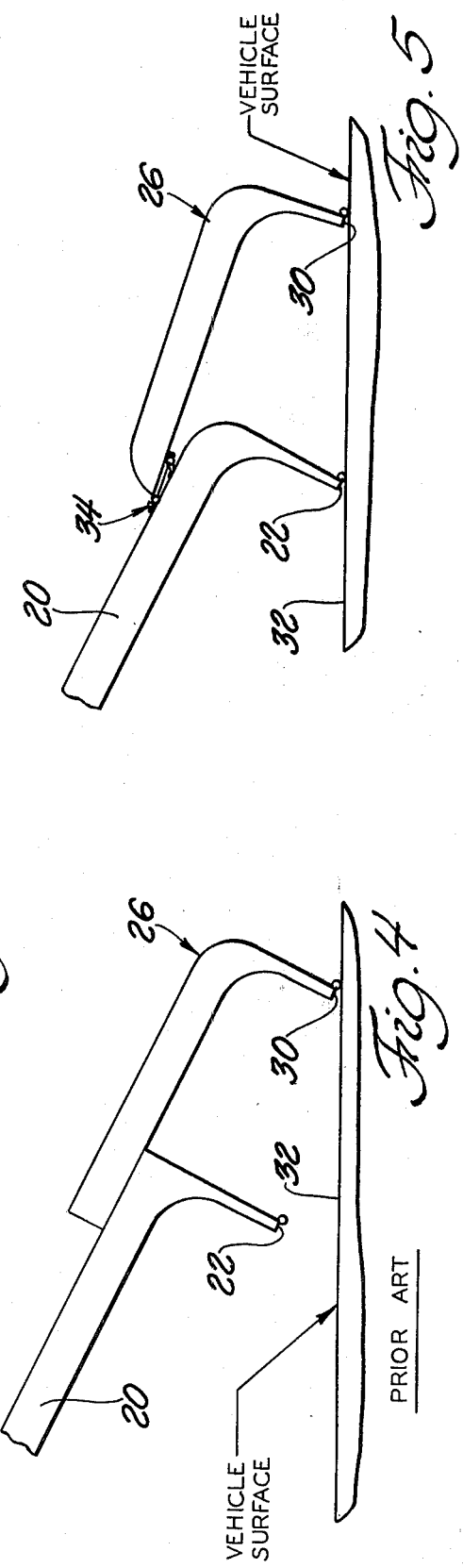

SECONDARY BAG ADJUSTMENT

TECHNICAL FIELD

This invention relates to an assembly for efficiently stripping fluid from an object. More specifically, the instant invention is best suited for stripping rinse water or the like from the surface of an automobile or other vehicle as it passes through an automobile car wash system.

BACKGROUND ART

The present use of substantially rectangular inflatable flexible bags to support a nozzle for stripping fluid from the surface of a vehicle has brought an improved and highly economical means of drying cars to the car wash industry. Such an assembly is taught by the U.S. Pat. No. 4,161,801 granted July 24, 1979 to Day et al. More specifically, unlike other dryer mechanisms utitlized in car wash systems, this assembly utilizes flexible bags having nozzles adapted to physically engage the surface of the vehicle whereby air under pressure flowing through the bag and nozzle literally strips water from the surface of a passing vehicle.

A problem is presented with respect to newer model cars having an almost vertically inclined rear window. The nozzle portion of the bag has a tendency to skip over the rear window portion of the trunk immediately adjacent thereto. To correct this situation, a hitchhiker bag has been developed. A main bag wich is in fluid connection with a plenum and hinges or pivots at the plenum connection as the vehicle passes by is provided with an opening located near the nozzle end thereof and to which one end of a secondary bag is adapted to be sewn or otherwise suitably secured so that air under pressure within the main bag will communicate with the interior of the secondary bag. The sewn connection between the main bag and the secondary bag permits the latter to pivot or hinge with respect to the main bag about a hinging axis which is adjacent the sewn connection. The secondary bag further includes a nozzle adapted to engage the vehicle to strip fluid therefrom. Tests have demonstrated that the secondary bag is an effective means of stripping fluid from a vehicle which would otherwise be left behind by the use of only the main bag. The subject invention provides means for controlling the hinging action of the secondary bag relative to the main bag.

STATEMENT OF THE INVENTION

According to the present invention, there is provided an apparatus for stripping fluid from the surface of an object including a flexible inflatable primary bag including a primary bag inlet end and a nozzle end and a bag opening disposed therebetween. A plenum has a chamber therein and a plenum opening therethrough, the primary bag inlet being releasably mounted about the plenum opening for allowing the flow of air from the plenum to the primary bag. The apparatus further includes a flexible inflatable secondary bag having an elongated secondary bag inlet secured about the bag opening for hinging movement thereabout and for allowing the flow of air therethrough. The apparatus is characterized by including hinging control means for controlling the hinging action of the secondary bag with respect to the primary bag.

FIGURES IN THE DRAWINGS

Other advantages of the present invention will be readily appreciated as the same becomes better understood by reference to the following detailed description when considered in connection with the accompanying drawings wherein:

FIG. 3 is a fragmentary cross-sectional view partially broken away taken substantially along lines 3—3 of FIG. 2;

FIG. 4 is a schematic representation of a main bag having a secondary bag mounted thereon engaging a vehicle surface; and FIG. 5 is a schematic representation of a main bag and a secondary bag mounted thereon constructed in accordance with the instant invention and engaging a vehicle surface.

DETAILED DESCRIPTION OF THE DRAWINGS

Figure 1:
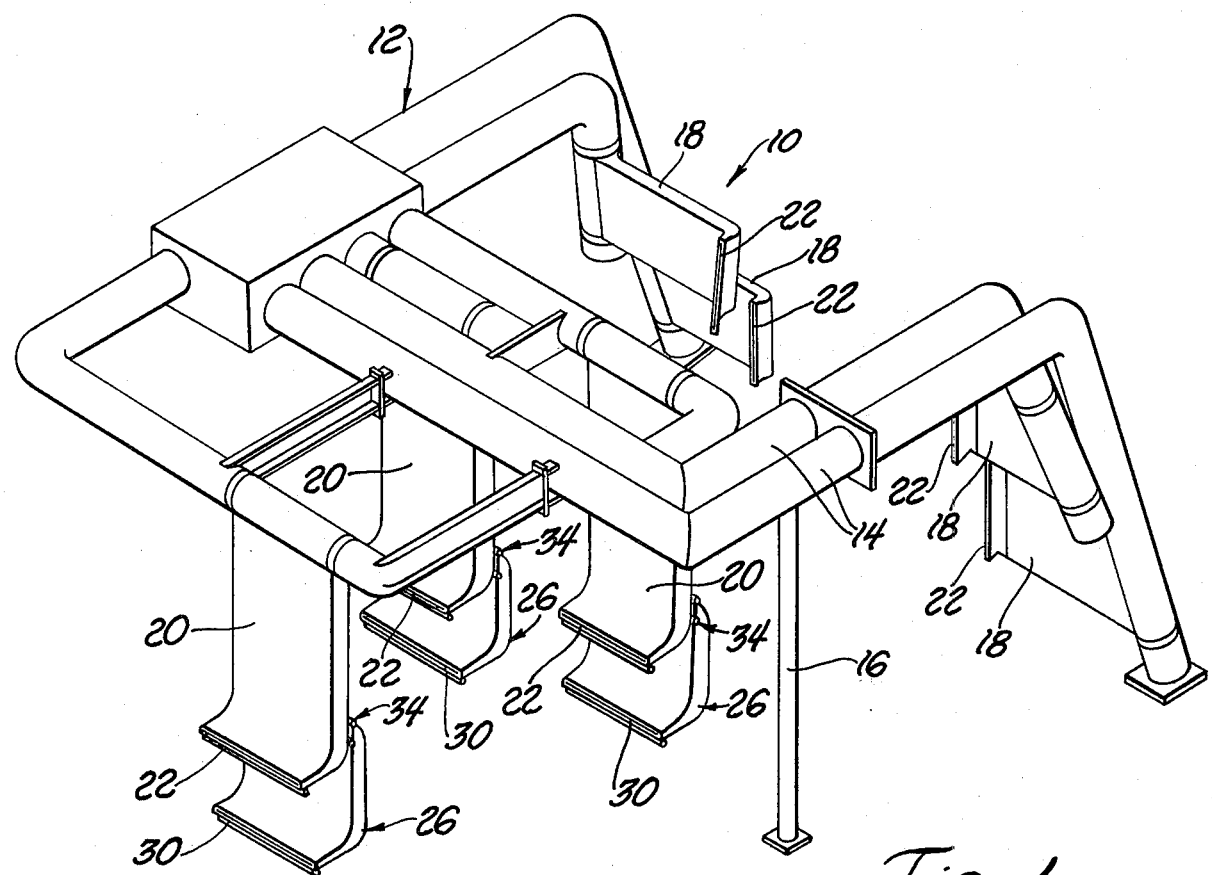
FIG. 1 is a perspective view of an apparatus for stripping fluid from the surface of an object constructed in accordance with the instant invention.

A drying station of a car wash system for stripping fluids from the surface of a vehicle, such as a car or van, is generally shown at 10 in FIG. 1. The station 10 includes an air distributor system generally indicated at 12. The air distributor system 12 includes a plurality of overhead ducts or plenums 14 which may be supported by the superstructure of the ceiling of the car wash building or by support legs or beams 16 or a combination of the two.

The drying station 10 further includes a plurality of flexible inflatable horizontally disposed primary or main bags 18 and vertically disposed primary or main bags 20. All of the primary bags 18 and 20 are essentially similar in that they are made from a flexible sheet of material, such as a thin plastic or cloth. The pieces of material are sewn together to form a desired shape. The bags include a primary bag inlet end which is connected about openings in the plenum 14. The primary bags further include a nozzle end 22 adapted to emit a stream of air when the bag is inflated. As shown in FIG. 3, each of the vertically disposed primary bags 20 further include a bag opening 24 disposed between the primary bag inlet end and nozzle end 22 thereof.

A flexible inflatable secondary bag, generally indicated at 26, has an elongated secondary bag inlet 28 secured about the bag opening 24 for hinging movement thereabout and for allowing the flow of air therethrough. More specifically, the secondary bag 26 is made from the same or similar material as the primary bags 18 and 20. The secondary bag is adapted to be sewn or otherwise suitably secured so that air under pressure within the main primary bag 20 will communicate with the interior of the secondary bag 26. The sewn connection between the primary bag 20 and the secondary bag 26 permits the latter to pivot or hinge with respect to the primary bag about a hinging axis adjacent to the connection therebetween. The secondary bag 26 is substantially rectangular when viewed in cross section whereby the secondary bag hinges about its longest cross-sectional length. The secondary bag 26 further includes a nozzle end 30 adapted to engage a vehicle surface to strip fluid therefrom.

As shown in FIGS. 4 and 5, as a vehicle 32 passes through the apparatus 10, the vertically hanging primary bags 20 and secondary bags 26 are deflected upwardly as the nozzles 22 and 30 thereof engage the vehicle surface. It has not been possible with prior art assemblies to control the hinging action of the secondary bags 26 in relation to the primary bags 20. The result, as shown in FIG. 4, is that the secondary bags 20 prevent the nozzle 22 of the primary bag 20 from contacting the vehicle surface 32. Accordingly, the prior art primary and secondary bag assemblies have not been sufficiently effective in removing fluid from the surface of a vehicle. The instant invention is characterized by including hinging control means generally indicated at 34 for controlling the hinging action of the secondary bags 26 with respect to the primary bags 20. More specifically, by controlling the cross-sectional area of the secondary bag inlet 28, the hinging action of the secondary bag 26 can be controlled. As shown in FIG. 5, at a given internal pressure of the primary bags 20 and secondary bags 26, the hinging control means 34 is adjusted so that both of the nozzles 22 and 30 of the primary and secondary bags 20 and 26, respectively, contact the vehicle surface 32 as the vehicle passes through the system and deflects the primary and secondary bags 20 and 26 upwardly.

The hinging control means 34 includes an adjustable frame 34 for selectively varying the cross-sectional area of the secondary bag inlet 28. The frame 34 includes a first and second rod member 36 and 38. Each of the rod members 36 and 38 engages the outer surface of the elongated side of the secondary bag inlet 28. The frame 34 further includes adjustable fasteners comprising an elongated bolt 40 and a nut threadedly mounted thereon 42. The fastening means 40, 42 adjustably fasten the first and second rod members 36 and 38 together about the secondary bag inlet 28 to determine the cross-sectional area of the secondary bag inlet 28. The first and second rod members 36 and 38 are brought closer together as the nut members 42 are threaded onto the elongated bolts 40. Thusly, the adjustment of the nut members 42 upon the elongated bolts 40 adjusts the cross-sectional area of the secondary bags 26 and, accordingly, the hinging action of the secondary bag 26 relative to the primary bag 20.

The first and second rod members 36 and 38 include a hole 44 therethrough proximal to each end thereof. Each of the bolts 40 passes through both of the holes 44 at each end of the first and second rod members 36 and 38 to connect the first and second rod members 36 and 38 together. An adjustable spacer 46 is disposed about each of the bolts 40 and between the first and second rod members 36 and 38 for spacing the first and second rod members 36 and 38 apart. As shown in FIGS. 3 and 4, the adjustable spacer comprises a flexible tube 46 disposed about each of the elongated bolts 40. The flexible tube 46 includes an end portion engaging each of the first and second rod members 36 and 38. The rod members further include a flexible cap member 48 disposed about each end thereof. As shown in FIG. 3, the first and second rod members 36 and 38 may be constructed from a nonflexible material such as aluminum. The cap members 48 provide a seal about the end of the tubular rod members 36 and 38.

Figure 2:
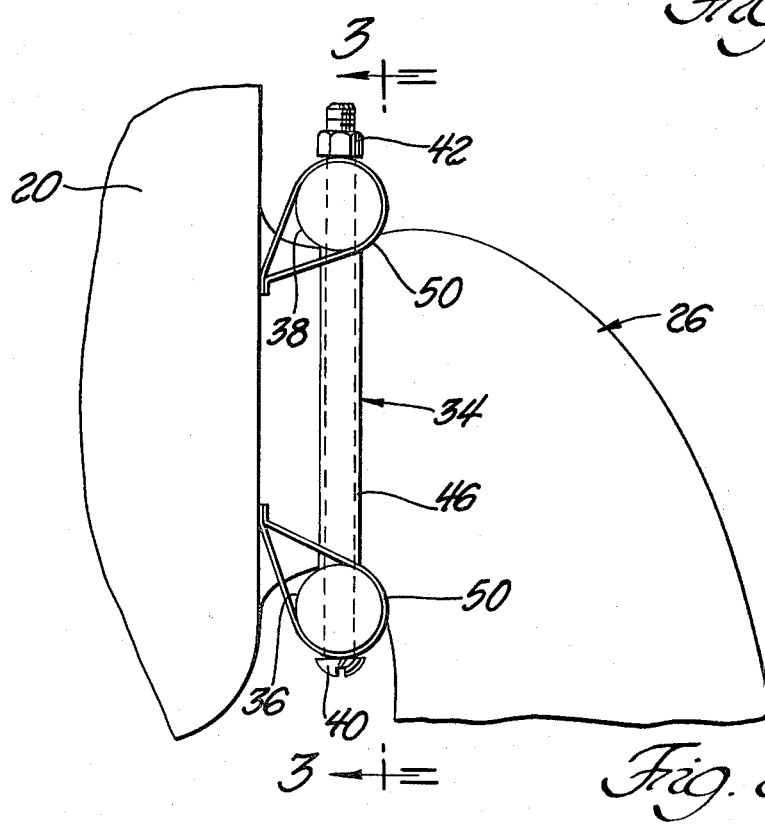
FIG. 2 is a fragmentary side-elevational view of the instant invention mounted on a secondary bag.

The instant invention further includes retaining means for retaining the adjustable frame 34 about the secondary bag inlet 28. As shown in FIGS. 2 and 3, the retaining means includes a plurality of loops 50 which are made from a material similar to the material of the primary and secondary bags 20 and 26. The loops 50 are fixedly secured to the primary bag 20 and are disposed about the ends of the first and second rod members 36 and 38 for retaining the first and second rod members 36 and 38 about the secondary bag inlet 28. In other words, the loops 50 are disposed on the primary bag 20 so as to engage the first and second rod members 36 and 38 whereby the first and second rod members 38 and 38 are disposed about the elongated length of the secondary bag 26 adjacent to the secondary bag inlet 28.

In operation, the first and second rod members 36 and 38 are inserted into the loops 50 and secured together by the bolts 40 and nut members 42 disposed outside the loops 50. Air is allowed to flow from the primary bag 20 to the secondary bag 26 through the secondary bag inlet 28. The nut members 42 are threadedly adjusted along the length of the elongated bolts 40 so as to change the cross-sectional area of the secondary bag inlet 28 to adjust the hinging action of the secondary bag 26 in relation to the primary bag 20. When the frame 34 is properly adjusted, both of the nozzles 22 and 30 of the primary and secondary bags 20 and 26 will contact the vehicle surface 32 as shown in FIG. 5.

Obviously, many modifications and variations of the present invention are possible in light of the above teachings. It is, therefore, to be understood that within the scope of the appended claim, wherein reference numerals are merely for convenience and are not to be in any way limiting, the invention may be practiced otherwise than as specifically described.

The embodiments of the invention in which an exclusive property or privilege is claimed are defined as follows:

1. An apparatus (10) for stripping fluid from the surface of an object, said apparatus (10) comprising: a flexible inflatable primary bag (20) including a primary bag inlet and a nozzle end (22) and a bag opening (24) disposed therebetween; a plenum (14) having a chamber therein and a plenum opening therethrough, said primary bag inlet being releasably mounted about said plenum opening for allowing the flow of air from said plenum (14) to said primary bag (20); a flexible inflatable secondary bag (26) having an elongated secondary bag inlet (28) secured about said bag opening (24) for hinging movement and a nozzle end (30) for allowing the flow of air therethrough; and characterized by hinging control means (34) for controlling the hinging action of said secondary bag (26) with respect to said primary bag (20).

2. An apparatus as set forth in claim 1 further characterized by said hinging control means (26) including an adjustable frame (34) for selectively varying the cross-sectional area of said secondary bag inlet (28) said apparatus (10) including retaining means for retaining said frame (34) about said secondary bag inlet (28).

3. An apparatus as set forth in claim 2 further characterized by said secondary bag (26) being substantially rectangular when viewed in cross section, said frame (34) including first and second rod members (36, 38), each of said rod members (36, 38) engaging the outer surface of an elongated side of said secondary bag inlet (28), said frame (34) further including adjustable fastening means (40, 42) for adjustably fastening said first and second rod members (36, 38) together about said secondary bag inlet (28) to determine the cross-sectional area of said secondary bag inlet (28).

4. An apparatus as set forth in claim 3 further characterized by each of said first and second rod members (36, 38) including a hole (44) therethrough proximal to each end thereof, said fastening means including a pair of bolts (40), one of said bolts (40) passing through both of said holes (44) at each end of said first and second rod members (36, 38), said fastening means further including a nut (42) adjustably mounted on each of said bolts (40) and adjustable spacer means (46) disposed about each of said bolts (40) and between said first and second rod members (36, 38) for spacing said first and second rod members (36, 38) apart.

5. An apparatus as set forth in claim 3 further characterized by said adjustable spacer means (46) including a flexible tube (46) disposed about each of said bolts (40) and including an end portion engaging each of said first and second rod members (36, 38).

6. An apparatus as set forth in claim 5 further characterized by said retaining means including a plurality of loops (50) fixedly secured to said primary bag (20), said loops being disposed about the ends of said first and second rod members (36, 38) for retaining said first and second rod members (36, 38) about said secondary bag inlet (28).

7. A hinging control frame (34) for controlling the hinging action of a flexible inflatable secondary bag (26) which is mounted on a flexible inflatable primary bag (20) for allowing the flow of air therethrough to strip fluid from the surface of an object, said frame (34) comprising: first and second rod members (36,38), each of first and second rod members (36,38) having a hole (44) therethrough proximal to each end thereof; a bolt (40) passing through both of said holes (44) at each end of said first and second rod members (36,38); a nut (42) adjustably mounted on each of said bolts (40); and characterized by spacer means (46) disposed about each of said bolts (40) and between said first and second rod members (36,38) for spacing said first and second rod members (36,38) apart about the secondary bag (26) adjacent to the primary bag (20) to control the hinging action of the secondary bag (26) with respect to the primary bag (20).

8. An apparatus as set forth in claim 7 further characterized by said adjustable spacer means (46) including a flexible tube (46) disposed about each of said bolts (40) and including an end portion engaging each of said first and second rod members (36, 38).

* * * * *